US005969966A

United States Patent [19]

Sawa et al.

[11] Patent Number: 5,969,966

[45] Date of Patent: Oct. 19, 1999

[54] POWER CONVERTING APPARATUS AND METHOD USING A MULTIPLE THREE-PHASE PWM CYCLOCONVERTER SYSTEM

[75] Inventors: Toshihiro Sawa; Tsuneo Kume; Koichi Hirano, all of Fukuoka, Japan

[73] Assignee: Kabushiki Kaisha Yaskawa Denki, Kitakyushu, Japan

[21] Appl. No.: 09/029,262

[22] PCT Filed: Sep. 4, 1996

[86] PCT No.: PCT/JP96/02495

§ 371 Date: Mar. 9, 1998

§ 102(e) Date: Mar. 9, 1998

[87] PCT Pub. No.: WO97/09773

PCT Pub. Date: Mar. 13, 1997

[30] Foreign Application Priority Data

Sep. 8, 1995 [JP] Japan .................................... 7-231794

[51] Int. Cl.$^{6}$ ........................ H02M 13/02; H02M 5/257; H02M 5/275

[52] U.S. Cl. .............................. 363/163; 363/161; 363/8; 363/10

[58] Field of Search .................................... 363/163, 161, 363/164, 159, 157, 8, 9, 10

[56] References Cited

U.S. PATENT DOCUMENTS

| | | | |
|---|---|---|---|
| 3,908,130 | 9/1975 | Lafuze | 290/46 |
| 4,013,937 | 3/1977 | Pelly et al. | 363/161 |
| 4,074,348 | 2/1978 | Salzmann et al. | 363/160 |
| 4,086,621 | 4/1978 | Vukasovic | 363/136 |
| 4,105,897 | 8/1978 | Stratton et al. | 363/159 |
| 4,349,867 | 9/1982 | Otsuka et al. | 363/160 |
| 4,529,925 | 7/1985 | Tanaka et al. | 363/161 |
| 4,570,214 | 2/1986 | Tanaka | 363/160 |
| 4,670,826 | 6/1987 | Tanaka | 363/161 |
| 4,673,823 | 6/1987 | Tanaka | 363/160 |
| 4,674,026 | 6/1987 | Tanaka | 363/160 |
| 5,198,970 | 3/1993 | Kawabata et al. | 363/37 |

*Primary Examiner*—Peter S. Wong
*Assistant Examiner*—Bao Q. Vu
*Attorney, Agent, or Firm*—Oblon, Spivak, McClelland, Maier & Neustadt, P.C.

[57] ABSTRACT

A power converting apparatus and a power converting method for driving a high voltage AC motor at a variable speed. Conventional invertor systems cannot solve technical subjects such as energy conservation, resource conservation, miniaturization, efficiency promotion and voltage and current waveform distortion suppression for improvement in environment needed by the market, and cannot solve another technical subject of improvement in redundancy such that, upon failure, operation is performed with a normal part. In the present invention, a power converting apparatus of a multiple three-phase pulse width modulation cycloconverter system for driving a high voltage AC motor at a variable speed is used, and bidirectional semiconductor switches are controlled so that voltages of AC outputs to be outputted to single-phase AC terminals of three-phase/single-phase pulse width modulation cycloconverters may have a same phase in each of units but electric angles of basic wave voltage phases may be different by 120 degrees from each other among the three units to drive a high voltage AC motor. If one of the cycloconverters fails, then the single-phase AC terminals of the failed cycloconverter are short-circuited and three sets of switches each consisting of two bidirectional semiconductor switches connected to three-phase AC terminals of the cycloconverters of the other two units in the same group as the failed cycloconverter are successively rendered conducting one by one set at equal time intervals to short-circuit the three sets of the bidirectional semiconductor switches to drive the high voltage AC motor at a variable speed.

20 Claims, 6 Drawing Sheets

POWER CONVERTING APPARATUS AND METHOD USING A MULTIPLE THREE-PHASE PWM CYCLOCONVERTER SYSTEM

BACKGROUND OF THE INVENTION

1. Field of the Invention

This invention relates to a power converting apparatus and a power converting method for driving a medium to high voltage AC motor at a variable speed, and particularly to a power converting apparatus and a power converting method of a pulse width modulation (PWM) controlling system.

2. Discussion of the Background

Conventionally, for variable speed driving of a high voltage AC motor, a system which employs a high voltage invertor or another system wherein a step-down transformer and a step-up transformer are connected to the input side and the output side of a low voltage invertor to drive the high voltage AC motor is employed.

FIG. 6 is a circuit diagram of a driving circuit which employs a high voltage invertor of a conventional example, and FIG. 7 is a concept diagram illustrating four quadrature operation based on the relationship between the torque and the speed of a motor. In FIG. 6, reference symbol 10 denotes a high voltage AC motor of an object of driving, 101 an invertor unit, 102 a smoothing capacitor unit, 103 a regenerative converter unit, 104A and 104B each denotes an AC reactor, and 105 denotes a three-phase transformer.

The invertor unit 101 includes three-level invertors of the neutral clamping type and employs, for power elements, a GTO (Gate Turn Off Thyristor, hereinafter referred to simply as GTO) to assure a high withstanding voltage for the elements. The power elements are connected in series to achieve divisional sharing of a voltage, and variable voltage variable frequency (VVVF) power is supplied from a high voltage DC power supply formed from the smoothing capacitor unit 102 to the invertor unit 101. In order to keep divisional sharing of a voltage of the GTOS, well known snubber circuits must be installed individually. In the converter unit which supplies a DC voltage to the smoothing capacitor unit 102, the capacity of the high voltage invertors is generally as high as several hundreds kW or more, and the construction of the regenerative converter unit 103 is used for damping energy processing upon deceleration or for four quadrature operation (forward driving, reverse driving, forward regeneration and reverse regeneration) illustrated in FIG. 7. In FIG. 6, two circuits each composed of a combination of thyristors and GTOs are used in series connection, and control between driving and regeneration is performed depending upon the direction of DC power. The regenerative converter unit 103 is connected to secondary windings of the three-phase transformer 105 through the AC reactors 104A and 104B while primary windings of the three-phase transformer 105 are connected to a high voltage commercial power supply so as to receive supply of power.

FIG. 8 is a circuit diagram showing a driving circuit which employs a low voltage invertor of a conventional example. In FIG. 8, reference numeral 10 denotes a high voltage AC motor of an object of driving, 106 an invertor unit, 107 a smoothing capacitor unit, 108 a regenerative converter unit, 109 an AC reactor, 110 a step-down transformer, and 111 a step-up transformer.

The invertor unit 106 includes IGBTs (Insulated Gate Bipolar Transistors, hereinafter referred to simply as IGBTs) and diodes connected in a three-phase bridge circuit and is pulse width modulation (hereinafter referred to simply as PWM) controlled so that it may output a voltage and a frequency necessary to drive the motor 10 through the step-up transformer 111. Since the invertor unit 106 is a low voltage invertor, it is connected to the high voltage AC motor 10 through the step-up transformer 111. Also the regenerative converter unit 108 is composed of IGBTs and diodes connected in a three-phase bridge circuit similarly as in the invertor unit 106, and is connected to secondary windings of the step-down transformer 110 through the AC reactor 109 while primary windings of the step-down transformer 110 are connected to a high voltage commercial power supply so as to receive supply of power. Meanwhile, also DC buses of the regenerative converter unit 108 and the invertor unit 106 are connected to each other through the smoothing capacitor unit 107. Both of the invertor unit 106 and the regenerative converter unit 108 are PWM controlled.

As other motor driving systems, for example, a multiple cycloconverter recited in "Cycloconverter Apparatus" disclosed in Japanese Patent Laid-Open Application No. Heisei 6-245511 and a PWM cycloconverter recited in "Power Converting Apparatus of a Pulse Width Controlling System" disclosed in Japanese Patent Publication Application No. Heisel 7-44834 are known. However, they are not directed to driving of a high voltage AC motor described above.

Meanwhile, the trend of the world is directed to energy conservation, resource conservation, minimum size, high efficiency and low-distortion voltage and current waveform for improvement in environment, and due to complication of application systems, improvement in operation reliability such as improvement in regard to redundancy is required. Also the motor driving systems of the prior art described above naturally become an object of such improvement.

However, from the point of view of energy conservation, resource conservation, minimum size, high efficiency and low-distortion voltage and current waveform for improvement in environment, both of the high voltage invertor system and the low voltage inverter system of the prior art examples described above have the following problems.

In the case of the high voltage invertor system of FIG. 6, a GTO is employed for main circuit elements in order to achieve a high voltage withstanding property. Since a GTO is not a high speed switching element, it is difficult to use a high carrier frequency, and reduction in noise in inverter driving or suppression of waveform distortion cannot be anticipated. Further, since a snubber circuit of a GTO repeats charging and discharging each time switching is performed, also the loss is high, and since it has a circuit construction which employs a high voltage element, assurance of insulation for a main circuit, a bus bar and so forth is required and the snubber circuit is not suitable for minimizing the inverter package. Furthermore, since a GTO driving power supply is required for each GTO and besides a high voltage is applied between control power supplies, it is not easy to generate the control power supplies, and this is a bottle neck to minimize the inverter package.

Meanwhile, in the case of the step-up system of the low voltage inverter of FIG. 8, since it is an IGBT invertor of a low voltage, while high fr equency PWM control is possible and reduction in noise can be anticipated, in order to achieve a large capacity, parallel connection of IGBTs is required, and a countermeasure for parallel balancing and a snubber circuit are required and minimum size is difficult. Further, also an increase in loss of IGBTs, bus bars and snubber circuits arising from high current is estimated, and minimization is difficult also from the phase of cooling. Furthermore, where step-up is performed by a transformer as seen in FIG. 8, since the switching speed of IGBTs is high, that is, since dV/dt upon switching is large, also there is another drawback that, by inductances of wiring lines, floating capacitances of the wiring lines, inductances of a transformer and so forth, a resonance voltage is generated in synchronism with switching of PWM control of an invertor, causing dielectric breakdown of the motor. As a countermeasure against the drawback, it has been proposed to insert a filter between the invertor unit 106 and the step-up transformer 111 of FIG. 8 as recited in "Output Filter Circuit of Voltage Type PWM Invertor" disclosed in Japanese Patent Laid-Open Application No. Heisei 1-72144. In addition, since, upon low frequency operation, the voltage/frequency ratio to be provided to the transformer is set to 1.5 to 2 times that in the proximity of a rated frequency by an invertor in order to assure starting torque, there is another problem that a larger transformer than a transformer for a commercial frequency is required so that magnetic saturation may not occur. Further, if the invertor 106 generates an offset voltage due to a dispersion in switching characteristic of the IGBTs and so forth, then since a DC voltage is applied to the step-up transformer 111, magnetic saturation occurs. Consequently, there is a problem also that excessive current flows.

As a countermeasure against harmonic distortion of an output voltage or current, while the high voltage invertor is controlled by 3-level control and both of PWM control and amplitude control are used, the low voltage invertor system employs only PWM control and exhibits large harmonic distortion. Also for the power supply voltage, since the regenerative converter unit 103 of the high voltage invertor system of FIG. 6 uses 120-degree energization waveforms, low order harmonic distortion remains, and with the low voltage invertor system of FIG. 8, since the regenerative converter unit 108 performs PWM control, although low order harmonics of power supply current are suppressed, high order harmonics remain.

As described above, the conventional invertor systems cannot solve the technical subjects such as energy conservation, resource conservation, minimum size, high efficiency and low-distortion voltage and current waveform for improvement in environment needed by the market. Further, any of the systems cannot solve the technical subject of improvement in redundancy such that, upon failure, operation is performed with a normal part.

Further, of the systems other than the invertor systems, the cycloconverter recited in "Cycloconverter Apparatus" disclosed in Japanese Patent Laid-Open Application No. Heisei 6-245511 cannot raise, since it is of the power supply commutation system, the output frequency only up to ⅓ to ½ the power supply frequency. Consequently, the cycloconverter is not suitable for motor driving.

An improvement of the cycloconverter just described is a PWM cycloconverter recited in "Power Converting Apparatus of the Pulse Width Controlling System" disclosed in Japanese Patent Laid-Open Application No. Heisei 7-44834. The PWM cycloconverter has the following characteristics.

1) Miniaturization is easy because it does not require such a DC circuit as is required by an invertor system.

2) The element loss is low and the efficiency is high because the number of elements inserted in series in a route from a power supply to a load is smaller than that of an invertor system.

3) Four quadrature operation is easy because direct AC-AC conversion is used.

However, since also this system is a PWM control power converting system of three-phase inputs and three-phase outputs, although low order harmonics of power supply current are suppressed, high order harmonics remain, and the technical subject of voltage and current waveform distortion suppression cannot be solved for both of the input and the output. Further, in order to drive a high voltage AC motor, a system wherein a power element is so formed as to have a high voltage withstanding property to make a high voltage PWM cycloconverter or a voltage is raised by a transformer is adopted, and the same subjects as those of the high voltage inverter system or the transformer step-up system of a low voltage invertor occur. Furthermore, in the conventional examples described above, all of the systems have a problem that, if some function is damaged, then operation cannot be continued.

SUMMARY OF THE INVENTION

It is an object of the present invention to provide a power converting apparatus and a power converting method of a multiple three-phase pulse width modulation cycloconverter system for driving a high voltage AC motor by which a high voltage of low distortion is generated using a low voltage invertor technique.

According to the present invention, a power converting apparatus of a multiple three-phase pulse width modulation cycloconverter system for driving a high voltage AC motor at a variable speed is constructed such that the power converting apparatus comprises a single three-phase transformer having a single set of primary windings and 3×n sets of secondary windings or m ($1 \leqq m \leqq n$) three-phase transformers each having a single set of primary windings and 3×j (j=n/m) sets of secondary windings, 3×n three-phase reactors individually connected to the secondary windings, and 3×n three-phase/single-phase pulse width modulation cycloconverters individually connected to the three-phase reactors, that the primary windings of the three-phase transformer or transformers are connected to an external AC power supply while the secondary windings are arranged in three units, each one unit with n sets of secondary windings, and the electric angles between n sets of each secondary windings of the n sets in same unit are different by (60°÷k) (where $1 \leqq k \leqq n$) in phase from each other (however, where k=1, the phase difference is 60 degrees, and this is equivalent, where a transformer load is a three-phase full wave rectifying circuit, to that no phase difference appears), and the secondary windings in the three units which have the electric angles of the same phase form n groups, the secondary windings, the three-phase reators and the three-phase/single-phase pulse width modulation cycloconverters connected in series, that each of the three-phase/single-phase pulse width modulation cycloconverters includes six pulse width modulation controlled bidirectional semiconductor switches capable of flowing current in the opposite directions therethrough and allowing self switching on and self switching off, three filter capacitors, three-phase AC terminals connected to corresponding ones of the three-phase reactors, and single-phase AC terminals connected to the outside, and the six bidirectional semiconductor switches are connected in a three-phase bridge circuit to the three-phase AC terminals and the single-phase AC terminals while the filter capacitors are connected in delta or star connection to the three-phase AC terminals, that the bidirectional semiconductor switches control so that voltages of AC outputs to be outputted to the single-phase AC terminals of the three-phase/single-phase pulse width modulation cycloconverters may have a same phase in each of the units but electric angles of basic wave voltage phases may be different by 120 degrees from each other among the three units, and that the single-phase AC terminals of the three-phase/single-phase pulse width modulation cycloconverters in the same units are connected in series and the corresponding single-phase AC terminals at the opposite ends of the series connections are connected in star connection between the three units while the other three terminals are connected to three input terminals of the external high voltage AC motor which is an object of driving.

The power converting apparatus may comprise, in place of the three-phase AC reactors, means for using leak inductances of the secondary windings of the three-phase transformer or transformers.

Each of the bidirectional semiconductor switches of the three-phase/single-phase pulse width modulation cycloconverters may include two semiconductor switches each including a semiconductor element having a self interrupting capability and a diode connected in reverse parallel to the semiconductor element such that a conducting direction thereof is opposite to that of the semiconductor element, the two semiconductor switches being connected in series such that polarities thereof are opposite to each other, or may include two semiconductor switches each including a semiconductor element having a self interrupting capability and a diode connected in series to the semiconductor element such that a conducting direction thereof coincides with that of the semiconductor element, the two semiconductor switches being connected in parallel such that polarities thereof are opposite to each other, or otherwise may be constructed such that a semiconductor element having a self interrupting capability is connected to two DC terminals of four diodes connected in a single-phase bridge such that conducting directions may be the same direction and two AC terminals of the single-phase bridge are used as input/output terminals.

According to the present invention, a power converting method of a multiple three-phase pulse width modulation cycloconverter system for driving a high voltage AC motor at a variable speed is constructed such that, using a power converting apparatus of a multiple three-phase pulse width modulation cycloconverter system, the bidirectional semiconductor switches are controlled by a pulse width modulation system so that voltages of AC outputs to be outputted to the single-phase AC terminals of the three-phase/single-phase pulse width modulation cycloconverters may have a same phase in each of the units but electric angles of basic wave voltage phases between the three units may be different by 120 degrees from each other to drive the high voltage AC motor at a variable speed.

The power converting method of a multiple three-phase pulse width modulation cycloconverter system may be constructed such that, when the power converting apparatus is to operate in a condition wherein m (where $1 \leqq m \leqq n$) ones of the n three-phase/single-phase pulse width modulation cycloconverters of one of the units fail, the single-phase AC terminals of the failed three-phase/single-phase pulse width modulation cycloconverters are short-circuited and three sets of two those ones of the bidirectional semiconductor switches connected to the three-phase AC terminals of those of the three-phase/single-phase pulse width modulation cycloconverters of the other two units which correspond to the failed three-phase/single-phase pulse width modulation cycloconverters are successively rendered conducting one by one set at equal time intervals to short-circuit the three sets of the bidirectional semiconductor switches, and the high voltage AC motor is driven at a variable speed using the remaining (n−m) three-phase/single-phase pulse width modulation cycloconverters of the three sets, or such three sets as mentioned above are successively rendered conducting one by one set each time a detected direction of current between the single-phase AC terminals exhibits a reversal to short-circuit the three sets of the bidirectional semiconductor switches, and the high voltage AC motor is driven at a variable speed using the remaining (n−m) three-phase/single-phase pulse width modulation cycloconverters of the three sets.

When it is tried to perform variable speed driving of a high voltage AC motor using the power converting apparatus of a multiple three-phase pulse width modulation cycloconverter system of the construction described above, since waveform control of the three-phase/single phase pulse width modulation cycloconverters of the three units each composed of a plurality of groups is performed, input and output voltages and currents of waveforms of low distortion are obtained, and since direct conversion from AC to AC is performed, also supply and regeneration of power can be performed freely. Further, since no DC circuit is involved, the number of components is small, and also the number of elements interposed in series in a route from a power supply to a load is small.

Where leak inductances of the secondary windings of the three-phase transformer or transformers are used, also the three-phase AC reactors can be omitted.

Further, since each of the units is formed from a plurality of three-phase/single-phase pulse width modulation cycloconverters, even upon failure, operation can be continued using the three-phase/single-phase pulse width modulation cycloconverters of the remaining groups which are normal.

DESCRIPTION OF THE PREFERRED EMBODIMENTS

Figure 1:
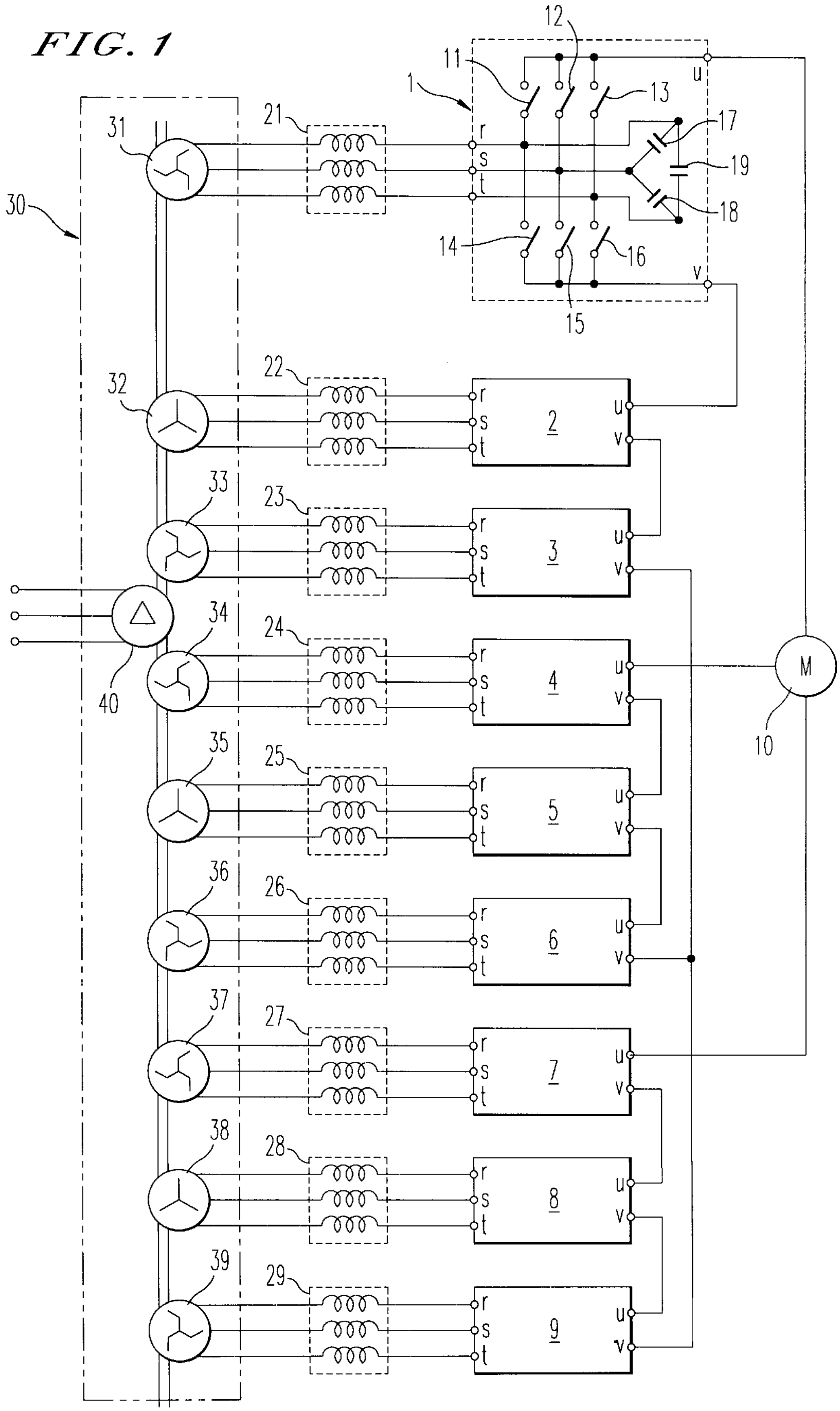
FIG. 1 is a circuit diagram of a driving circuit which employs a power converting apparatus of a multiple three-phase pulse width modulation (hereinafter referred to simply as PWM) cycloconverter system of a first embodiment of the present invention.

In the following, embodiments of the present invention are described with reference to the drawings. FIG. 1 is a circuit diagram of a driving circuit which employs a power converting apparatus of a multiple three-phase pulse width modulation (hereinafter referred to simply as PWM) cycloconverter system of a first embodiment of the present invention. In FIG. 1, reference numerals 1 to 9 denote each a three-phase/single-phase PWM cycloconverter, 10 denotes a high voltage AC motor which is an object of driving, 11 to 16 denote bidirectional semiconductor switches, 17 to 19 filter capacitors, 21 to 29 three-phase AC reactors, 30 denotes a three-phase transformer, 31 to 39 denote secondary windings of the three-phase transformer 30, and 40 denotes primary windings of the three-phase transformer 30.

Since the three-phase/single-phase PWM cycloconverters 1 to 9 have a same structure, description is given of the three-phase/single-phase PWM cycloconverter 1. The three-phase/single-phase PWM cycloconverter 1 includes six bidirectional semiconductor switches 11 to 16, three filter capacitors 17 to 19, three-phase AC terminals r, s and t and single-phase AC terminals u and v. The six bidirectional semiconductor switches 11 to 16 through which current can be flowed in the opposite directions and which allow self switching on and self switching off are connected in a three-phase bridge circuit to the three-phase AC terminals r, s and t and the single-phase AC terminals u and v, and the filter capacitors 17 to 19 are connected in delta connection to the three-phase AC terminals r, s and t.

Generally, while three-phase/single-phase PWM cycloconverters are used as a combination of 3×n such cycloconverters, FIG. 1 shows an example wherein n=3 and 9 such cycloconverters are involved. In the present example, the three-phase AC terminals r, s and t of the nine three-phase/single-phase PWM cycloconverters 1 to 9 are connected to the nine sets of secondary windings 31 to 39 of the three-phase transformer 30 through the nine three-phase AC reactors 21 to 29, respectively, and the three-phase transformer 30 has the single set of primary windings 40 and the nine sets of secondary windings 31 to 39. The primary windings 40 are connected to an AC power supply. It is otherwise possible to use leak inductances of the secondary windings 31 to 39 of the three-phase transformer 30 in place of the three-phase AC reactors 21 to 29.

The entire apparatus is composed of three units each formed from n (three in the present example) three-phase/single-phase PWM cycloconverters (in the present example, 1 to 3, 4 to 6 and 7 to 9), and the single-phase AC terminals u and v in each of the units are connected in series and those ones of the terminals u and v at the opposite ends of the series connections are connected in star connection between the three units while the other three terminals are connected to three input terminals of the high voltage AC motor 10 which is an object of driving.

By the combination described above, a power converting apparatus of the multiple PWM cycloconverter system of three-phase inputs and three-phase outputs is formed.

Basic wave voltages of AC outputs outputted to the single-phase AC terminals u and v of the n three-phase PWM cycloconverters (in the present example, 1 to 3, 4 to 6 and 7 to 9) of each unit are controlled so that they may have a same phase, and the three units are controlled so that they may generate AC outputs of which the electrical angles of basic wave voltage phases are different by 120 degrees in phase from each other.

Since each of the three-phase/single-phase PWM cycloconverters 1 to (3×n) (in the present example, 1 to 9) serves as a single-phase load, in order to establish load balance on the power supply side and cancel low order harmonic currents among the secondary windings of the three-phase transformer 30, the secondary windings of the three-phase transformer 30 are divided into n groups each including those of the first to nth three-phase/single-phase PWM cycloconverters of the three units which have same order numbers (in the present example, three groups of 1, 4 and 7, 2, 5 and 8, and 3, 6 and 9), and the windings are formed in same conditions so that induced voltages in each group may have an equal phase, but the phase of each group may exhibit a phase difference of 60°÷k (1≦k≦n, normally k=n). In the example of FIG. 1, the primary windings 40 of the three-phase transformer 30 are connected in delta connection while the secondary windings 31, 34 and 37 of the first group are connected in zigzag connection so as to provide a delay of an electric angle of 50 degrees from the primary windings 40; the second group 32, 35 and 38 is connected in star connection so as to provide a delay of another electric angle of 30 degrees from the primary windings 40; and the third group 33, 36 and 39 is connected in zigzag connection so as to provide a delay of a further electric angle of 10 degrees from the primary windings 40. Consequently, if the three-phase/single-phase PWM cycloconverters are controlled symmetrically, then a voltage or current of power supply harmonics lower than 22nd order harmonics of the power supply frequency is not generated in principle.

While the phase difference between the secondary windings of the three-phase transformer 30 is 60°/3=20° since n=3 in the example of FIG. 1, if n=5, then 60°/5=12°, and a voltage or current of power supply harmonics lower than 34th order harmonics of the power supply frequency is not generated.

In the following, a countermeasure for improvement in redundancy is described. The characteristic of a multiple power converting apparatus resides in that a plurality of power converters having a same function like the three-phase/single-phase PWM cycloconverters 1 to 9 of FIG. 1 are used, and even if some of the power converters are disconnected because of failure, operation can be continued.

If it is assumed that the three-phase/single-phase PWM cycloconverter 4 of FIG. 1 fails, then the single-phase AC terminals u and v of it are short-circuited using a wire or a bus bar while output voltages are generated by the three-phase/single-phase PWM cycloconverters 5 and 6 which are normal. Also for the other units, in order to allow balanced operation, three sets of switches each consisting of two bidirectional semiconductor switches 11 and 14, 12 and 15, and 13 and 16 connected to the three-phase AC terminals r, s and t of the three-phase/single-phase PWM cycloconverter 1 of the same group are rendered conducting so as to be short-circuited successively one by one set at equal time intervals so that output voltages are generated by the three-phase/single-phase PWM cycloconverters 2 and 3. Similarly, three sets of switches each consisting of two bidirectional semiconductor switches connected to the three-phase AC terminals r, s and t of the three-phase/single-phase PWM cycloconverter 7 of the same group of the remaining unit are rendered conducting so as to be short-circuited successively one by one set at equal time intervals so that output voltages are generated by the three-phase/single-phase PWM cycloconverters 8 and 9.

By the countermeasure described above, balanced output voltages of three phases can be generated. However, the maximum output voltage is reduced to ⅔ that of a normal operation. Further, in place of rendering the three sets of switches each having two bidirectional semiconductor switches connected to the three-phase AC terminals r, s and t conducting so as to be short-circuited successively one by one set at equal time intervals, it is possible to detect the direction of current between the single-phase AC terminals u and v of the three-phase/single-phase PWM cycloconverters 1 and 7 and successively render, each time the current direction reverses, the three sets of the bidirectional semiconductor switches conducting so as to be short-circuited one by one set to perform operation.

Figure 2:
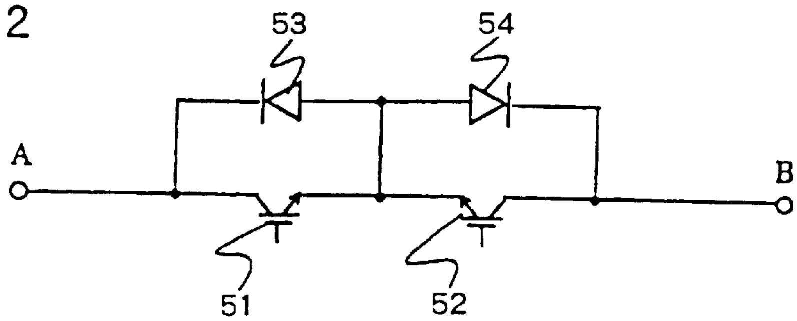
FIG. 2 is a circuit diagram showing an example of a detailed construction of a bidirectional semiconductor switch shown in FIG. 1.
Figure 3:
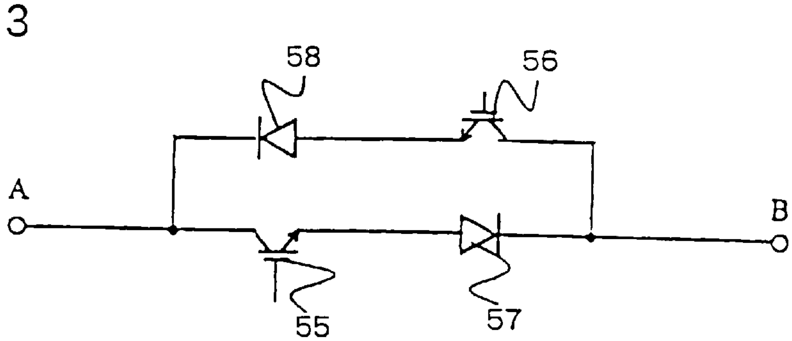
FIG. 3 is a circuit diagram showing another example of a detailed construction of the bidirectional semiconductor switch shown in FIG. 1.
Figure 4:
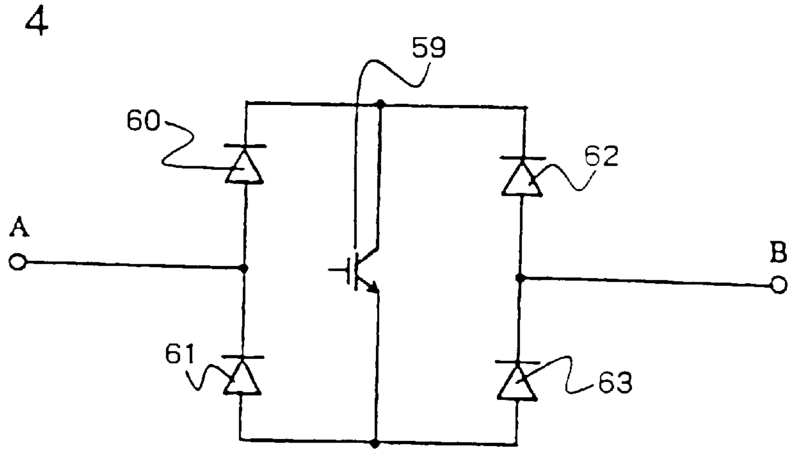
FIG. 4 is a circuit diagram showing a further example of a detailed construction of the bidirectional semiconductor switch shown in FIG. 1.

FIGS. 2 to 4 are circuit diagrams showing detailed construction examples of the bidirectional semiconductor switches 11 to 16 shown in FIG. 1. Referring to FIGS. 2 to 4, reference numerals 51, 52, 55, 56 and 59 denote each an IGBT, and 53, 54, 57, 58 a nd 60 t o 63 denote each a diode.

In FIG. 2, a function as a bidirectional semiconductor switch is constructed as a single bidirectional semiconductor switch composed of two semiconductor switches connected in series in the opposite polarities and each formed from a semiconductor element (in FIG. 2, an IGBT) having a self interrupting capability such as a transistor, an IGBT or an FET and a diode connected to the semiconductor element such that the conducting direction thereof may be reverse to that of the semiconductor element. When current flows from A to B, it passes through the IGBT 51 and the diode 54, but when current flows from B to A, it passes through the IGBT 52 and the diode 53.

In FIG. 3, a function of a bidirectional semiconductor switch is constructed as a single bidirectional semiconductor switch composed of two semiconductor switches connected in parallel in the opposite polarities and each formed from a semiconductor element (in FIG. 3, an IGBT) having a self interrupting capability such as a transistor, an IGBT or an FET and a diode connected in series to the semiconductor element such that the conducting direction thereof may be same as that of the semiconductor element. When current flows from A to B, it passes through the IGBT 55 and the diode 57, but when current flows from B to A, it passes through the IGBT 56 and the diode 58.

In FIG. 4, a function of a bidirectional semiconductor switch is constructed as a single bidirectional semiconductor switch formed from four diodes connected in single-phase bridge connection and a semiconductor element (in FIG. 4, an IGBT) having a self interrupting capability such as a transistor, an IGBT or an FET and connected to two DC terminals such that the conducting direction thereof may be same as that of the diodes while two AC terminals of the single-phase bridge are used as input and output terminals. When current flows from A to B, it passes through the diode 60, the IGBT 59 and the diode 63, but when current flows from B to A, it passes through the diode 62, the IGBT 59 and the diode 61.

Figure 5:
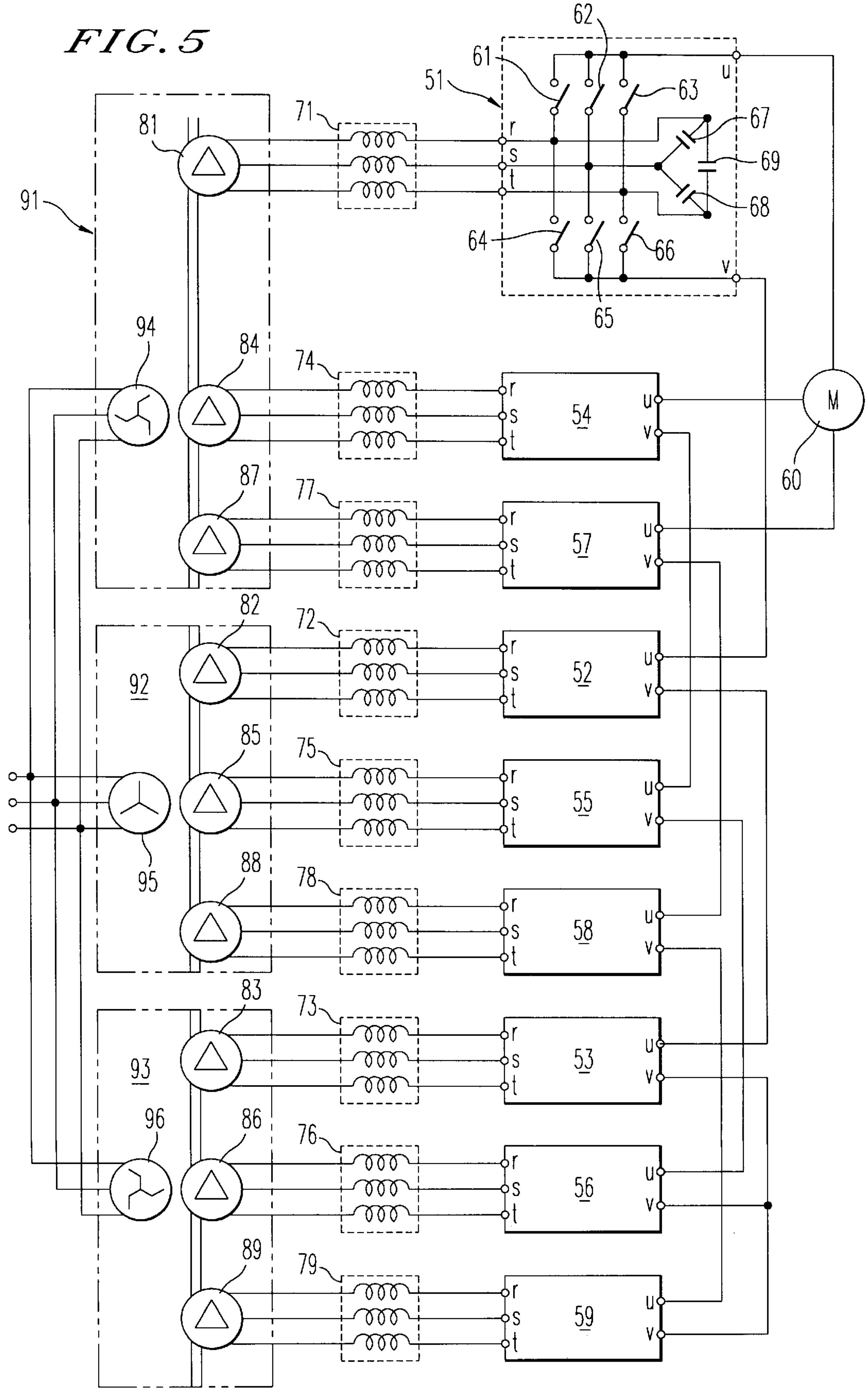
FIG. 5 is a circuit diagram of a driving circuit which employs a power converting apparatus of a multiple three-phase pulse width modulation cycloconverter system of a second embodiment of the present invention.
Figure 6:
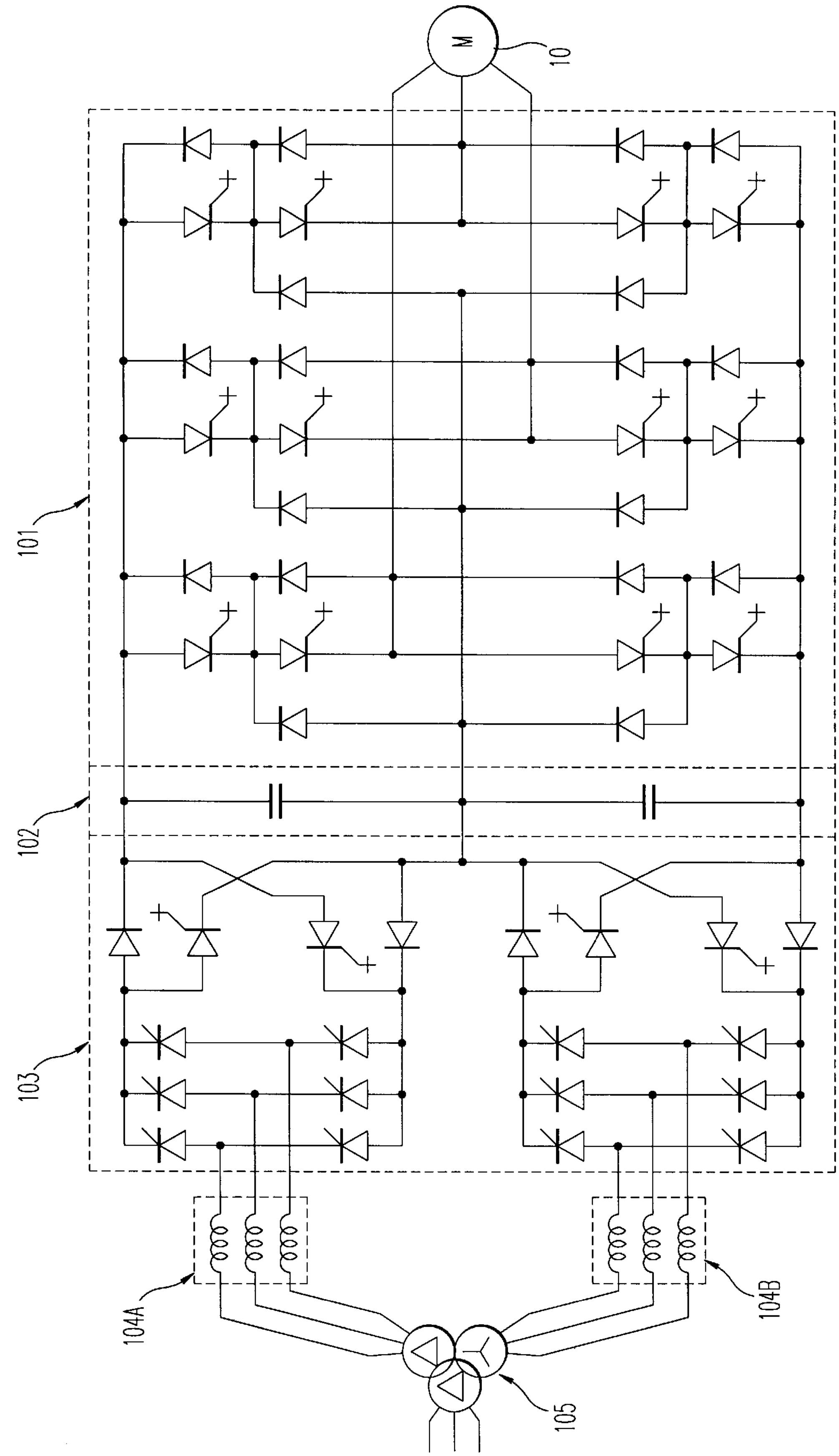
FIG. 6 is a circuit diagram of a driving circuit which employs a high voltage invertor of a conventional example.
Figure 7:
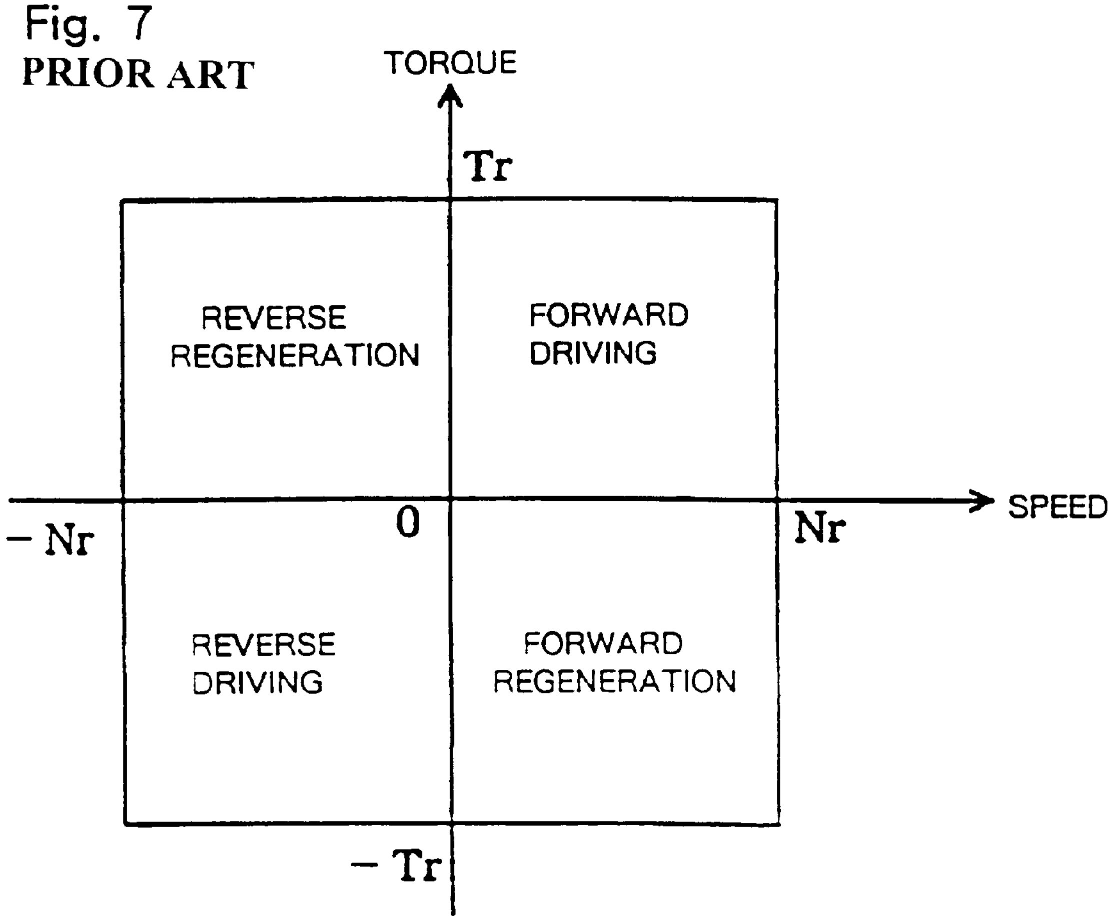
FIG. 7 is a concept diagram illustrating four quadrature operation based on a relationship between the torque and the speed of a motor.
Figure 8:
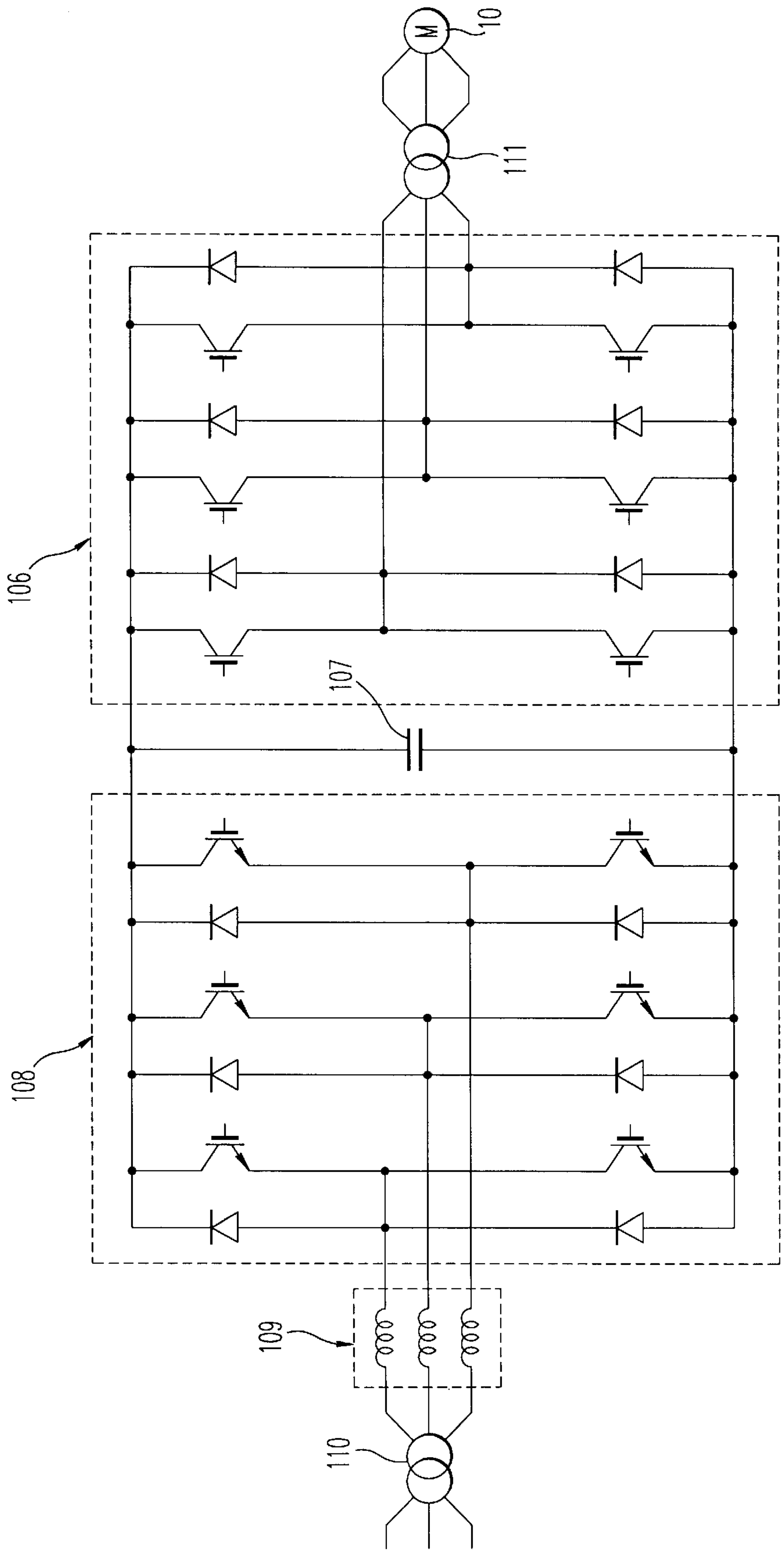
FIG. 8 is a circuit diagram of a driving circuit which employs a low voltage invertor of a conventional example.

FIG. 5 is a circuit diagram of a driving circuit which uses a power converting apparatus of a multiple three-phase pulse width modulation (hereinafter referred to simply as PWM) cycloconverter system of a second embodiment of the present invention. In FIG. 5, reference numerals 51 to 59 denote three-phase/single-phase PWM cycloconverters, 60 denotes a high voltage AC motor which is an object of driving, 61 to 66 denote bidirectional semiconductor switches, 67 to 69 filter capacitors, 71 to 79 three-phase AC reactors, 91, 92 and 93 three-phase transformers, 81 to 89 secondary windings of the three-phase transformers 91, 92 and 93, and 94, 95 and 96 primary windings of the three-phase transformers 91, 92 and 93.

Since the three-phase/single-phase PWM cycloconverters 51 to 59 have a same structure, description is given of the three-phase/single-phase PWM cycloconverter 51. The three-phase/single-phase PWM cycloconverter 51 includes six bidirectional semiconductor switches 61 to 66, three filter capacitors 67 to 69, three-phase AC terminals r, s and t, and single-phase AC terminals u and v. The six bidirectional semiconductor switches 61 to 66 through which current can be flowed in the opposite directions and which allow self switching on and self switching off are connected in a three-phase bridge circuit to the three-phase AC terminals r, s and t and the single-phase AC terminals u and v, and the filter capacitors 67 to 69 are connected in delta connection to the three-phase AC terminals r, s and t.

Generally, while three-phase/single-phase PWM cycloconverters are used as a combination of 3×n such cycloconverters, FIG. 5 shows an example wherein n=3 and 9 such cycloconverters are involved similarly as in FIG. 1. In the present example, the three-phase AC terminals r, s and t of the nine three-phase/single-phase PWM cycloconverters 51 to 59 are connected to the nine sets of secondary windings 81 to 89 of the m ($1 \leqq m \leqq n$) three-phase transformers each having one set of primary windings and 3×j (j=n/m) sets of secondary windings (since n=3 in the present example, m=3 and j=1), that is, the three-phase transformer 91 having one set of primary windings 94 and three sets of secondary windings 81, 84 and 87, the three-phase transformer 92 having one set of primary windings 95 and three sets of secondary windings 82, 85 and 88, and the three-phase transformer 93 having one set of primary windings 96 and three sets of secondary windings 83, 86 and 89 through the nine three-phase AC reactors 71 to 79, respectively. The primary windings 94 to 96 are connected to an AC power supply. It is otherwise possible to use, in place of the three-phase AC reactors 71 to 79, leak inductances of the secondary windings 81 to 89 of the three three-phase transformers 91 to 93.

The AC terminals u and v of the three three-phase/single-phase PWM cycloconverters 51 to 53 are connected in series to form one unit while the AC terminals u and v of the three single-phase PWM cycloconverters 54 to 56 and 57 to 59 are connected in series to form two units similarly, and one of the ends of the three units are connected in star connection while the other ends are connected to the high voltage AC motor 60 which serves as a load.

By the combination described above, a power converting apparatus of a multiple PWM cycloconverter system of three-phase inputs and three-phase outputs is constructed.

Basic wave voltages of AC outputs outputted to the single-phase AC terminals u and v of the three three-phase/single-phase PWM cycloconverters (in the present example, 51 to 53, 54 to 56 and 57 to 59) of each unit are controlled so that they may have a same phase, and the three units are controlled so that they may generate AC outputs of which electrical angles of the basic wave voltage phases are different by 120 degrees in phase from each other.

Since each of the three-phase/single-phase PWM cycloconverters 51 to {50+(3×n)} (in the present example, 51 to 59) serves as a single-phase load, in order to establish load balance on the power supply side and cancel low order harmonic current between the secondary windings of the three three-phase transformers 91 to 93, the windings of the three-phase transformers 91 to 93, that is, the secondary windings 81, 84 and 87 of the three-phase transformer 91 connected to the AC terminals r, s and t of the single-phase PWM cycloconverters 51, 54 and 57 of the first unit, the secondary windings 82, 85 and 88 of the three-phase transformer 92 connected to the AC terminals r, s and t of the single-phase PWM cycloconverters 52, 55 and 58 of the second unit and the secondary windings 83, 86 and 89 of the three-phase transformer 93 connected to the AC terminals r, s and t of the single-phase PWM cycloconverters 53, 56 and 59 of the third unit, are wound in same conditions so that induced voltages may have equal phases. In the example of FIG. 5, the secondary windings 81 to 89 of the three three-phase transformers 91, 92 and 93 are connected in delta connection while the primary windings 94 of the three-phase transformer 91 are wound in zigzag connection so that they present a delay of an electric angle of 50 degrees with respect to the secondary windings 81, 84 and 87. The primary windings 95 of the three-phase transformer 92 are wound in star connection so that they present a delay of an electric angle of 30 degrees with respect to the secondary windings 82, 85 and 88. The primary windings 96 of the three-phase transformer 93 are wound in zigzag connection so that they present a delay of an electric angle of 10 degrees with respect to the secondary windings 83, 86 and 89.

Consequently, if the three-phase/single-phase PWM cycloconverters are controlled symmetrically, then a voltage or current of power supply harmonics lower than 22nd order harmonics of the power supply frequency is not generated in principle.

A countermeasure for improvement in redundancy and the construction of the bidirectional semiconductor switches are same as those of the first embodiment, and accordingly, description of them is omitted here.

While the embodiments described above are described in connection with an example of a high voltage AC motor, the application of the power converting apparatus and the power converting method of the multiple three-phase PWM cycloconverter system of the present invention is not limited to a high voltage AC motor, but they can be applied to all AC motors.

As described above, where a multiple three-phase PWM cycloconverter of the present invention is used, since a DC circuit such as an invertor system is not required, miniaturization is easy, and since the number of elements interposed in series in a route from a power supply to a load is small, the element loss is low and the efficiency is high. Further, since waveform control of the individual three-phase/single-phase PWM cycloconverters is performed by the means described above, input and output voltages and currents of waveforms of low distortion are obtained, and supply and regeneration of power can be performed freely due to direct AC to AC conversion. Further, even upon failure, operation is possible using a normal part.

In this manner, a power converting apparatus of a multiple three-phase pulse width modulation cycloconverter system of the present invention and a power converting method in which the power converting apparatus is used have an effect that they can solve technical subjects such as energy conservation, resource conservation, miniaturization, efficiency promotion and voltage and current waveform distortion suppression for improvement in environment needed by the market and also raise the redundancy and the reliability in operation is improved, and consequently, they have the possibility that they may be utilized widely for control of AC motors for which variable speed driving is required.

We claim:

1. A power converting apparatus of a multiple three-phase pulse width modulation cycloconverter system for driving a high voltage AC motor at a variable speed, characterized in that said power converting apparatus comprises a single three-phase transformer having a single set of primary windings and 3×n sets of secondary windings, 3×n three-phase reactors individually connected to said secondary windings, and 3×n three-phase/single-phase pulse width modulation cycloconverters individually connected to said three-phase reactors, where n is a positive whole number, that said primary windings of said three-phase transformer are connected to an external AC power supply while said 3×n secondary windings are arranged in three units, each one unit with n sets of secondary windings, and the electric angles between n set of said each secondary windings of said n sets in same unit are different by (where $1 \leqq k \leqq n$) in phase from each other and the said secondary windings in said three units which have electric angles of the same phase form n groups, said secondary windings, said three-phase reactors and said three-phase/single-phase pulse width modulation cycloconverters connected in series, that each of said three-phase/single-phase pulse width modulation cycloconverters includes six pulse width modulation controlled bidirectional semiconductor switches capable of flowing current in the opposite directions therethrough and allowing self switching on and self switching off, three filter capacitors, three-phase AC terminals connected to corresponding ones of said three-phase reactors, and single-phase AC terminals connected to the outside, and said six bidirectional semiconductor switches are connected in a three-phase bridge circuit to said three-phase AC terminals and said single-phase AC terminals while said filter capacitors are connected in delta or star connection to said three-phase AC terminals, that the bidirectional semiconductor switches control so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other among said three units, and that the single-phase AC terminals of the three-phase/single-phase pulse width modulation cycloconverters in same ones of said units are connected in series and corresponding ones of the single-phase AC terminals at the opposite ends of the series connections are connected in star connection between said three units while the other three terminals are connected to three input terminals of the external high voltage AC motor which is an object of driving.

2. A power converting apparatus of a multiple three-phase pulse width modulation cycloconverter system for driving a high voltage AC motor at a variable speed, characterized in that said power converting apparatus comprises m ($1 \leqq m \leqq n$) three-phase transformers each having a single set of primary windings and 3×j (j=n/m) sets of secondary windings, 3×n three-phase reactors individually connected to the secondary windings, and 3×n three-phase/single-phase pulse width modulation cycloconverters individually connected to said three-phase reactors, where n is a positive whole number, that said primary windings of said three-phase transformer are connected to an external AC power supply while said 3×n secondary windings are arranged in three units, each one unit with n sets of secondary windings, and the electric angles between n set of said each secondary windings of said n sets in same unit are different by (where $1 \leqq k \leqq n$) in phase from each other and the said secondary windings in said three units which have electric angles of the same phase form n groups, said secondary windings, said three-phase reactors and said three-phase/single-phase pulse width modulation cycloconverters connected in series, that each of said three-phase/single-phase pulse width modulation cycloconverters includes six pulse width modulation controlled bidirectional semiconductor switches capable of flowing current in the opposite directions therethrough and allowing self switching on and self switching off, three filter capacitors, three-phase AC terminals connected to corresponding ones of said three-phase reactors, and single-phase AC terminals connected to the outside, and said six bidirectional semiconductor switches are connected in a three-phase bridge circuit to said three-phase AC terminals and said single-phase AC terminals while said filter capacitors are connected in delta or star connection to said three-phase AC terminals, that the bidirectional semiconductor switches control so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other between said three units, and that the single-phase AC terminals of the three-phase/single-phase pulse width modulation cycloconverters in same ones of said units are connected in series and corresponding ones of the single-phase AC terminals at the opposite ends of the series connections are connected in star connection between said three units while the other three terminals are connected to three input terminals of the external high voltage AC motor which is an object of driving.

3. A power converting apparatus of a multiple three-phase pulse width modulation cycloconverter system as set forth in claim 1, characterized in that said power converting apparatus comprises, in place of said three-phase AC reactors, means for using leakage inductances of said secondary windings of said three-phase transformer.

4. A power converting apparatus of a multiple three-phase pulse width modulation cycloconverter system as set forth in claim 2, characterized in that said power converting apparatus comprises, in place of said three-phase AC reactors, means for using leakage inductances of said secondary windings of said three-phase transformers.

5. A power converting apparatus of a multiple three-phase pulse width modulation cycloconverter system as set forth in claim 1, characterized in that each of said bidirectional semiconductor switches of said three-phase/single-phase pulse width modulation cycloconverters includes two semiconductor switches each including a semiconductor element having a self interrupting capability and a diode connected in reverse parallel to said semiconductor element such that a conducting direction thereof is opposite to that of said semiconductor element, said two semiconductor switches being connected in series such that polarities thereof are opposite to each other.

6. A power converting apparatus of a multiple three-phase pulse width modulation cycloconverter system as set forth in claim 1, characterized in that each of said bidirectional semiconductor switches of said three-phase/single-phase pulse width modulation cycloconverters includes two semiconductor switches each including a semiconductor element having a self interrupting capability and a diode connected in series to said semiconductor element such that a conducting direction thereof coincides with that of said semiconductor element, said two semiconductor switches being connected in parallel such that polarities thereof are opposite to each other.

7. A power converting apparatus of a multiple three-phase pulse width modulation cycloconverter system as set forth in claim 1, characterized in that each of said bidirectional semiconductor switches of said three-phase/single-phase pulse width modulation cycloconverters is constructed such that a semiconductor element having a self interrupting capability is connected to two DC terminals of four diodes connected in a single-phase bridge such that conducting directions may be the same direction and two AC terminals of said single-phase bridge are used as input/output terminals.

8. A power converting method of a multiple three-phase pulse width modulation cycloconverter system for driving a high voltage AC motor at a variable speed, characterized in that, using a power converting apparatus of a multiple three-phase pulse width modulation cycloconverter system wherein, said power converting apparatus comprises a single three-phase transformer having a single set of primary windings and 3×n sets of secondary windings, 3×n three-phase reactors individually connected to said secondary windings, and 3×n three-phase/single-phase pulse width modulation cycloconverters individually connected to said three-phase reactors, where n is a positive whole number, that said primary windings of said three-phase transformer are connected to an external AC power supply while said 3×n secondary windings are arranged in three units, each one unit with n sets of secondary windings, and the electric angles between n set of said each secondary windings of said n sets in same unit are different by 60°−k (where $1 \leqq k \leqq n$) in phase from each other and the said secondary windings in said three units which have electric angles of the same phase form n groups, said secondary windings, said three-phase reactors and said three-phase/single-phase pulse width modulation cycloconverters connected in series, that each of said three-phase/single-phase pulse width modulation cycloconverters includes six pulse width modulation controlled bidirectional semiconductor switches capable of flowing current in the opposite directions therethrough and allowing self switching on and self switching off, three filter capacitors, three-phase AC terminals connected to corresponding ones of said three-phase reactors, and single-phase AC terminals connected to the outside, and said six bidirectional semiconductor switches are connected in a three-phase bridge circuit to said three-phase AC terminals and said single-phase AC terminals while said filter capacitors are connected in delta or star connection to said three-phase AC terminals, that the bidirectional semiconductor switches control so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other among said three units, and that the single-phase AC terminals of the three-phase/single-phase pulse width modulation cycloconverters in same ones of said units are connected in series and corresponding ones of the single-phase AC terminals at the opposite ends of the series connections are connected in star connection between said three units while the other three terminals are connected to three input terminals of the external high voltage AC motor which is an object of driving;

said bidirectional semiconductor switches are controlled by a pulse width modulation system so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other among said three units to drive said high voltage AC motor at a variable speed.

9. A power converting method of a multiple three-phase pulse width modulation cycloconverter system as set forth in claim 8, characterized in that, when said power converting apparatus is to operate in a condition wherein m (where 1≦m≦n) ones of the n three-phase/single-phase pulse width modulation cycloconverters of one of said units fail, the single-phase AC terminals of the failed three-phase/single-phase pulse width modulation cycloconverters are short-circuited and three sets of switches each consisting of two bidirectional semiconductor switches connected to said three-phase AC terminals of said three-phase/single-phase pulse width modulation cycloconverter in the same group which correspond to the failed three-phase/single-phase pulse width modulation cycloconverter of the other two unit are successively rendered conducting one by one set at equal time intervals to short-circuit the three sets of the bidirectional semiconductor switches, and said high voltage AC motor is driven at a variable speed using the remaining (n−m) three-phase/single-phase pulse width modulation cycloconverters of said three sets.

10. A power converting method of a multiple three-phase pulse width modulation cycloconverter system as set forth in claim 8, characterized in that, when said power converting apparatus is to operate in a condition wherein m (where 1≦m≦n) ones of the n three-phase/single-phase pulse width modulation cycloconverters of one of said units fail, the single-phase AC terminals of the failed three-phase/single-phase pulse width modulation cycloconverters are short-circuited and three sets of switches each consisting of two bidirectional semiconductor switches connected to said three-phase AC terminals of said three-phase/single-phase pulse width modulation cycloconverter in the same group which correspond to the failed three-phase/single-phase pulse width modulation cycloconverter of the other two unit are successively rendered conducting one by one set each time a detected direction of current between the single-phase AC terminals exhibits a reversal to short-circuit the three sets of the bidirectional semiconductor switches, and said high voltage AC motor is driven at a variable speed using the remaining (n−m) three-phase/single-phase pulse width modulation cycloconverters of said three sets.

11. A power converting apparatus of a multiple three-phase pulse width modulation cycloconverter system as set forth in claim 2, characterized in that each of said bidirectional semiconductor switches of said three-phase/single-phase pulse width modulation cycloconverters includes two semiconductor switches each including a semiconductor element having a self interrupting capability and a diode connected in reverse parallel to said semiconductor element such that a conducting direction thereof is opposite to that of said semiconductor element, said two semiconductor switches being connected in series such that polarities thereof are opposite to each other.

12. A power converting apparatus of a multiple three-phase pulse width modulation cycloconverter system as set forth in claim 3, characterized in that each of said bidirectional semiconductor switches of said three-phase/single-phase pulse width modulation cycloconverters includes two semiconductor switches each including a semiconductor element having a self interrupting capability and a diode connected in reverse parallel to said semiconductor element such that a conducting direction thereof is opposite to that of said semiconductor element, said two semiconductor switches being connected in series such that polarities thereof are opposite to each other.

13. A power converting apparatus of a multiple three-phase pulse width modulation cycloconverter system as set forth in claim 4, characterized in that each of said bidirectional semiconductor switches of said three-phase/single-phase pulse width modulation cycloconverters includes two semiconductor switches each including a semiconductor element having a self interrupting capability and a diode connected in reverse parallel to said semiconductor element such that a conducting direction thereof is opposite to that of said semiconductor element, said two semiconductor switches being connected in series such that polarities thereof are opposite to each other.

14. A power converting apparatus of a multiple three-phase pulse width modulation cycloconverter system as set forth in claim 2, characterized in that each of said bidirectional semiconductor switches of said three-phase/single-phase pulse width modulation cycloconverters includes two semiconductor switches each including a semiconductor element having a self interrupting capability and a diode connected in series to said semiconductor element such that a conducting direction thereof coincides with that of said semiconductor element, said two semiconductor switches being connected in parallel such that polarities thereof are opposite to each other.

15. A power converting apparatus of a multiple three-phase pulse width modulation cycloconverter system as set forth in claim 3, characterized in that each of said bidirectional semiconductor switches of said three-phase/single-phase pulse width modulation cycloconverters includes two semiconductor switches each including a semiconductor element having a self interrupting capability and a diode connected in series to said semiconductor element such that a conducting direction thereof coincides with that of said semiconductor element, said two semiconductor switches being connected in parallel such that polarities thereof are opposite to each other.

16. A power converting apparatus of a multiple three-phase pulse width modulation cycloconverter system as set forth in claim 4, characterized in that each of said bidirectional semiconductor switches of said three-phase/single-phase pulse width modulation cycloconverters includes two semiconductor switches each including a semiconductor element having a self interrupting capability and a diode connected in series to said semiconductor element such that a conducting direction thereof coincides with that of said semiconductor element, said two semiconductor switches being connected in parallel such that polarities thereof are opposite to each other.

17. A power converting apparatus of a multiple three-phase pulse width modulation cycloconverter system as set forth in claim 2, characterized in that each of said bidirectional semiconductor switches of said three-phase/single-phase pulse width modulation cycloconverters is constructed such that a semiconductor element having a self interrupting capability is connected to two DC terminals of four diodes connected in a single-phase bridge such that conducting directions may be the same direction and two AC terminals of said single-phase bridge are used as input/output terminals.

18. A power converting apparatus of a multiple three-phase pulse width modulation cycloconverter system as set forth in claim 3, characterized in that each of said bidirectional semiconductor switches of said three-phase/single-phase pulse width modulation cycloconverters is constructed such that a semiconductor element having a self interrupting capability is connected to two DC terminals of four diodes connected in a single-phase bridge such that conducting directions may be the same direction and two AC terminals of said single-phase bridge are used as input/output terminals.

19. A power converting apparatus of a multiple three-phase pulse width modulation cycloconverter system as set forth in claim 4, characterized in that each of said bidirectional semiconductor switches of said three-phase/single-phase pulse width modulation cycloconverters is constructed such that a semiconductor element having a self interrupting capability is connected to two DC terminals of four diodes connected in a single-phase bridge such that conducting directions may be the same direction and two AC terminals of said single-phase bridge are used as input/output terminals.

20. A power converting method of a multiple three-phase pulse width modulation cycloconverter system for driving a high voltage AC motor at a variable speed, characterized in that, using a power converting apparatus of a multiple three-phase width modulation cycloconverter system wherein, said power converting apparatus comprises m ($1 \leqq m \leqq n$) three-phase transformers each having a single set of primary windings and $3 \times j$ ($j=n/m$) sets of secondary windings, $3 \times n$ three-phase reactors individually connected to the secondary windings, and $3 \times n$ three-phase/single-phase pulse width modulation cycloconverters individually connected to said three-phase reactors, where n is a positive whole number, that said primary windings of said three-phase transformer are connected to an external AC power supply while said $3 \times n$ secondary windings are arranged in three units, each one unit with n sets of secondary windings, and the electric angles between n set of said each secondary windings of said n sets in same unit are different by $60° \div k$ (where $1 \leqq k \leqq n$) in phase from each other and the said secondary windings in said three units which have electric angles of the same phase form n groups, said secondary windings, said three-phase reactors and said three-phase/single-phase pulse width modulation cycloconverters connected in series, that each of said three-phase/single-phase pulse width modulation cycloconverters includes six pulse width modulation controlled bidirectional semiconductor switches capable of flowing current in the opposite directions therethrough and allowing self switching on and self switching off, three filter capacitors, three-phase AC terminals connected to corresponding ones of said three-phase reactors, and single-phase AC terminals connected to the outside, and said six bidirectional semiconductor switches are connected in a three-phase bridge circuit to said three-phase AC terminals and said single-phase AC terminals while said filter capacitors are connected in delta or star connection to said three-phase AC terminals, that the bidirectional semiconductor switches control so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other between said three units, and that the single-phase AC terminals of the three-phase/single-phase pulse width modulation cycloconverters in same ones of said units are connected in series and corresponding ones of the single-phase AC terminals at the opposite ends of the series connections are connected in star connection between said three units while the other three terminals are connected to three input terminals of the external high voltage AC motor which is an object of driving;

said bidirectional semiconductor switches are controlled by a pulse width modulation system so that voltages of AC outputs to be outputted to the single-phase AC terminals of said three-phase/single-phase pulse width modulation cycloconverters may have a same phase in each of said units but electric phase angles of fundamental voltage waveform may be different by 120 degrees from each other among said three units to drive said high voltage AC motor at a variable speed.

* * * * *